United States Patent [19]
Dilthey et al.

[11] Patent Number: 4,584,457
[45] Date of Patent: Apr. 22, 1986

[54] DEVICE FOR ARC WELDING, IN PARTICULAR SUBMERGED-ARC WELDING, WITH ONE OR SEVERAL FUSIBLE ELECTRODES

[75] Inventors: Ulrich Dilthey, Eching; Ulrich Plantikow, Düsseldorf; Walter Kopp, Unterschleissheim, all of Fed. Rep. of Germany

[73] Assignee: Thyssen AG, vorm August Thyssen-Hutte, Duisburg, Fed. Rep. of Germany

[21] Appl. No.: 622,416

[22] Filed: Jun. 20, 1984

[30] Foreign Application Priority Data
Jun. 21, 1983 [DE] Fed. Rep. of Germany ....... 3322215

[51] Int. Cl.⁴ .............................................. B23K 9/10
[52] U.S. Cl. ................... 219/130.21; 219/73; 219/137 PS; 219/137.71
[58] Field of Search .................... 219/137.71, 130.21, 219/137 PS, 73

[56] References Cited
U.S. PATENT DOCUMENTS
3,851,137  11/1974  Verhagen et al. ............. 219/130.21
3,906,184  9/1975   Gibbs et al. ..................... 219/130.21
3,978,311  8/1976   Toth ................................ 219/137.71

Primary Examiner—Clifford C. Shaw
Attorney, Agent, or Firm—Sprung Horn Kramer & Woods

[57] ABSTRACT

A device for arc welding having one or more fusible electrodes (15) which are in each case supplied from an alternating-current source (14) having a falling characteristic. The feed rate of the electrode (15) is regulated for constant arc length as a function of the arc voltage. Via a further regulator (37), the deposition efficiency is regulated by supplying the regulator (37) with the feed rate as actual value and changing the welding-current intensity as a function of this value. The change in welding-current intensity leads to an increase or decrease in arc length which, in turn, is compensated via the first regulator by changing the feed rate.

4 Claims, 1 Drawing Figure

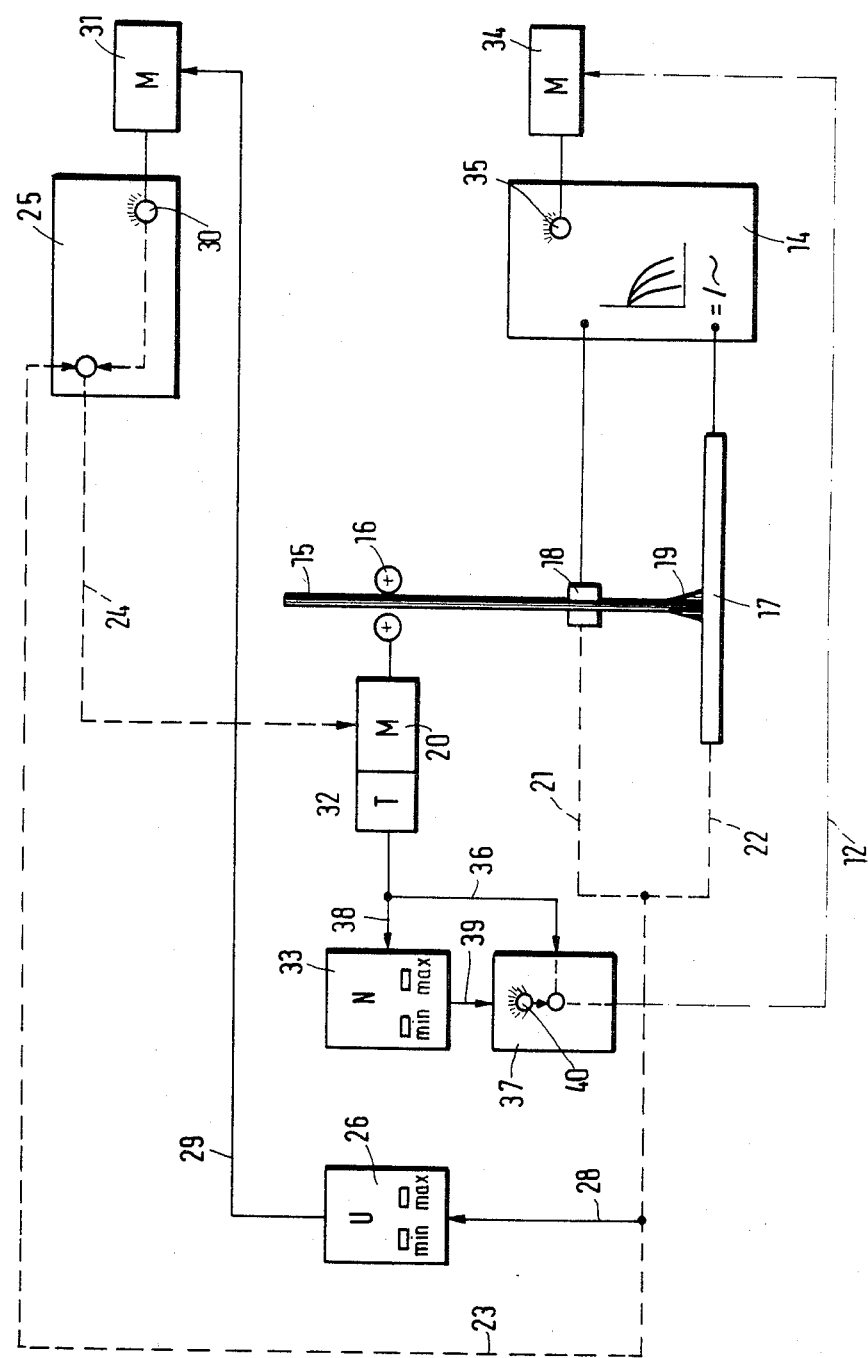

DEVICE FOR ARC WELDING, IN PARTICULAR SUBMERGED-ARC WELDING, WITH ONE OR SEVERAL FUSIBLE ELECTRODES

BACKGROUND OF THE INVENTION

The invention relates to a device for arc welding, in particular submerged-arc welding, with one or several fusible electrodes which are in each case supplied from an alternating-current source with falling characteristic and are advanced by a feed means, the feed rate being regulated by a regulator, which is supplied with the arc voltage as the actual value for the arc length, in such a manner that the arc length is constant.

Compared with arc welding using a direct-current source with a nearly horizontal voltage/current characteristic, arc welding using an alternating-current source with a falling characteristic has advantages and disadvantages. In the case of arc welding with a horizontal characteristic, the feed means can be set to a constant feed rate. The arc length remains essentially constant in this case because, if the arc voltage is constant, the tendency towards a smaller distance of the electrode from the workpiece is countered by increased current intensity and thus greater deposition rate because of the horizontal characteristic. This advantage is opposed by the disadvantage that the magnetic fields of the arcs have an unfavourable effect on each other when closely adjacent. In addition, the simultaneous operation of several electrodes with direct current requires a return line which has correspondingly large dimensions.

The demand for high deposition efficiencies is met by the simultaneous use of several electrodes. Such requirements occur with deposit welding and especially with profiling welding in which a workpiece is virtually generated only from the welding material. Not infrequently, more than twelve electrodes are simultaneously used.

Investigations with a device of the type initially mentioned have shown that with the simultaneous use of several electrodes, the arc length of which is regulated in accordance with the arc voltage, the deposition efficiencies of the individual electrodes are different despite equal current intensity at all electrodes. The result of these different deposition efficiencies are welding beads of different height produced by the electrodes used next to each other. With several deposit layers, this leads to large dimensional differences. In addition, the different deposition efficiencies have the effect that the initially identical wire lengths are used up after periods of different length. In practice, this means that the reels carrying the wire must be changed either at different times or with lengths still remaining on the reels.

SUMMARY OF THE INVENTION

The invention has the object of creating a device for arc welding, of the type initially mentioned, in which the deposition efficiency of the welding wire is constant.

According to the invention, this object is achieved when a further regulator, which is supplied with the feed rate as the actual value for the deposition efficiency, regulates the welding-current intensity in such a manner that the deposition efficiency is constant.

In the device according to the invention, the regulation of the arc length essential for the welding quality is primarily carried out as before via the arc voltage. The additional regulation of the deposition efficiency via the feed rate of the welding wire leads to a displacement of the working point while keeping the arc voltage constant. With simultaneous arc welding with two or more fusible electrodes, the deposition efficiency is guaranteed to be identical at all three electrodes because of the fact that the feed rate is regulated.

Investigations with the device according to the invention have shown that the changes in wire feed rate effected via the first regulator for keeping the arc length constant do not cause any significant changes in deposition efficiency particularly at low welding rate. On the basis of this finding, according to a development of the invention the regulator for the welding-current intensity is therefore associated with a limiter which releases the actuating signal to the welding current source only if the limit value or values set are exceeded by the actual value of the feed rate or if the feed rate drops below this value or values. This development contributes to a smoothing of the regulation of the welding-current intensity insofar as a change in the welding current takes place only if the intensity leaves the range set by the limit values. The limit range within which the feed rate can fluctuate without the characteristic of the current source having to be changed for the purpose of keeping the deposition efficiency constant can be determined by simple tests for the respective welding task. Smoothing of the regulating circuit is appropriate if mechanically adjusted actuators, for example the core in a welding-current transformer, are used.

The optimum nominal value of the arc voltage for the respective welding task is predetermined by the operator at a reference generator of the regulator. In order to preclude an erroneous false setting from leading to faulty weldings, a further development of the invention provides for the regulator for the feed rate to be associated with a limiter to which the arc voltage is applied and which adjusts the reference generator in the sense of an adaptation to the voltage values of the range set if the limit values limiting a range are exceeded by the arc voltage or if this voltage drops below these limit values. By detecting the actual-value voltage as it wants to leave the preset range of the limiter, if the nominal value is erroneously falsely set and lies outside the range of the limit values set, because of the deviation between nominal and actual value because of the increase or decrease in feed rate and thus also of the distance between electrode and workpiece, it is possible to correct the wrong setting of the nominal value. Correction of the nominal value lasts unil the nominal value is located inside the limits of the limiter. This development of the invention thus guarantees that an adequate welding quality is guaranteed despite the falsely set nominal vaue.

BRIEF DESCRIPTION OF THE DRAWINGS

In the text which follows, the invention is explained in greater detail with the aid of a drawing representing in the FIGURE a schematic of an illustrative embodiment of the device.

DETAILED DESCRIPTION OF THE DRAWINGS

The welding wire 15, coming from a reel, not shown, is advanced by feed means consisting of a pair of rollers 16 with at least one driven roller and a direct-current motor 20, in the direction of the workpiece 17. During this process, the welding wire 15 passes a sliding contact 18 which, like the workpiece 17, is connected to a welding-current source 14. When current is supplied, an arc 19 burns between the electrode, formed by the welding wire 15, and the workpiece 17.

The arc voltage is detected via lines 21, 22 by a measurement-value generator, not shown, and supplied via a signal line 23 as an actual value to a regulator 25. This actual value is compared by the regulator 25 with a nominal value which can be set at the regulator. Corresponding to the deviation between nominal and actual value, the regulator supplies a signal to the direct-current motor 20 via the control line 24 to the effect that if the arc voltage is found to be too great, the feed rate is increased and, correspondingly, if the arc voltage is found to be too small, the feed rate is reduced so that as a result, the arc 19 has the desired predetermined length.

In addition, the arc voltage is supplied via a signal line 28 to a limiter 26 which can be set to a lower limit value and to an upper limit value. This limiter 26 supplies a control signal via the line 29 to a motor 31 which acts to adjust the reference generator 30 of the regulator 25.

The direct-current motor 20 is connected to a tacho-generator 32 which supplies a signal, representing the feed rate, via a line 36 to another regulator 37 having an actuator 40 for the feed rate and via a line 38 to another limiter 33. The limiter 33 is set to a lower and upper limit value for the feed rate. The limiter 33 supplies a signal via a signal line 39 to the regulator 37 only if the actual value of the feed rate is outside this range, so that this regulator supplies an actuating signal corresponding to the deviation between nominal and actual value via a control line 12 to a motor 34 which effects an adjustment of the nominal value of the current intensity so that because of the internal regulating circuit of the current source 14, the actual current intensity is matched to the nominal current intensity.

The device according to the invention works in the following manner:

After determining the limit values at the limiters 26, 33, the operator sets the arc voltage and the current intensity at the reference generators 30, 35. After the arc 19 has fired, the feed rate is set at the motor 20 by the actuating signal of the regulator 25 via the line 24 as a function of the comparison of nominal and actual value of the arc voltage and thus also of the length of the arc 19. If the feed rate does not correspond to the nominal value which is set at the actuator 40 of the regulator 37 and which is a measure of the deposition efficiency, the regulator 37 supplies an actuating signal via the line 12 to the motor 34 for changing the welding-current intensity. Thus, in the case where the feed rate is too low, the welding-current intensity is increased. This leads to a faster burn-off and thus to an increase in the length of the arc 19. The regulator 25 responds to the increase in arc length with an increased feed rate.

Thus it is possible with the device according to the invention to keep the deposition efficiency constant in this manner in the case of arc welding with a falling voltage/current characteristic whilst maintaining the arc length for an optimum welding result.

So that the small changes in wire feed rate, used for keeping the arc length constant, do not lead to a significant change in deposition efficiency, provision is made to allocate a limiter 33 to the regulator 37. This limiter 33 releases the regulator 37 for outputting an actuating signal only if the feed rate is outside a set tolerance range.

The limiter 26 has the task of correcting erroneous wrong adjustments at the reference adjuster 30. This occurs as a result of the fact that the limiter 26 supplies a control signal 29 if the arc voltage leaves a set tolerance range. In this case, the actuating motor 31 adjusts the reference generator 30 until its nominal value lies inside the predetermined range.

The device according to the invention is suitable not only but preferably for the use with several similar devices. Such devices guarantee that the same deposition efficiency is produced in every case. For the example explained initially, this means that with the same supply of welding wire for all devices, the welding wires are used up simultaneously. Because of the alternating current fed to the welding electrodes, no mutually interacting magnetic fields are produced so that the welding electrodes can be applied closely adjacent to each other. The alternating-current sources can be combined with respect to the phase relationship of the alternating currents in such a manner that no return conductor carrying a large current is required. Altogether, the device according to the invention thus offers considerable advantages as compared with a device working with direct current, having a direct-current source with a horizontal voltage/current characteristic.

We claim:

1. A device for arc welding and in particular submerged-arc welding comprising: feed means for supplying at least one fusible electrode at a feed rate; means for applying an alternating current with a falling characteristic to the fusible electrode to produce an arc having an arc length and arc voltage; first regulating means responsive to the value of the arc voltage for controlling the feed means to regulate the feed rate to maintain a constant arc length; and second regulating means responsive to the feed rate for controlling the current applying means to increase the current when the feed rate is lower than a given value and decrease the current when the feed rate is greater than a given value to maintain a constant deposition efficiency.

2. The device as in claim 1, wherein the second regulating means comprises a limiter for effecting an increase and decrease in the current when the feed rate drops below and exceeds selected limit values.

3. The device according to claim 2, wherein the first regulating means comprises a limiter for effecting a change in the feed rate when the arc voltage drops below and exceeds selected limit values.

4. The device according to claim 1, wherein the first regulating means comprises a limiter for effecting a change in the feed rate when the arc voltage drops below and exceeds selected limit values.

* * * * *